Figure 1:
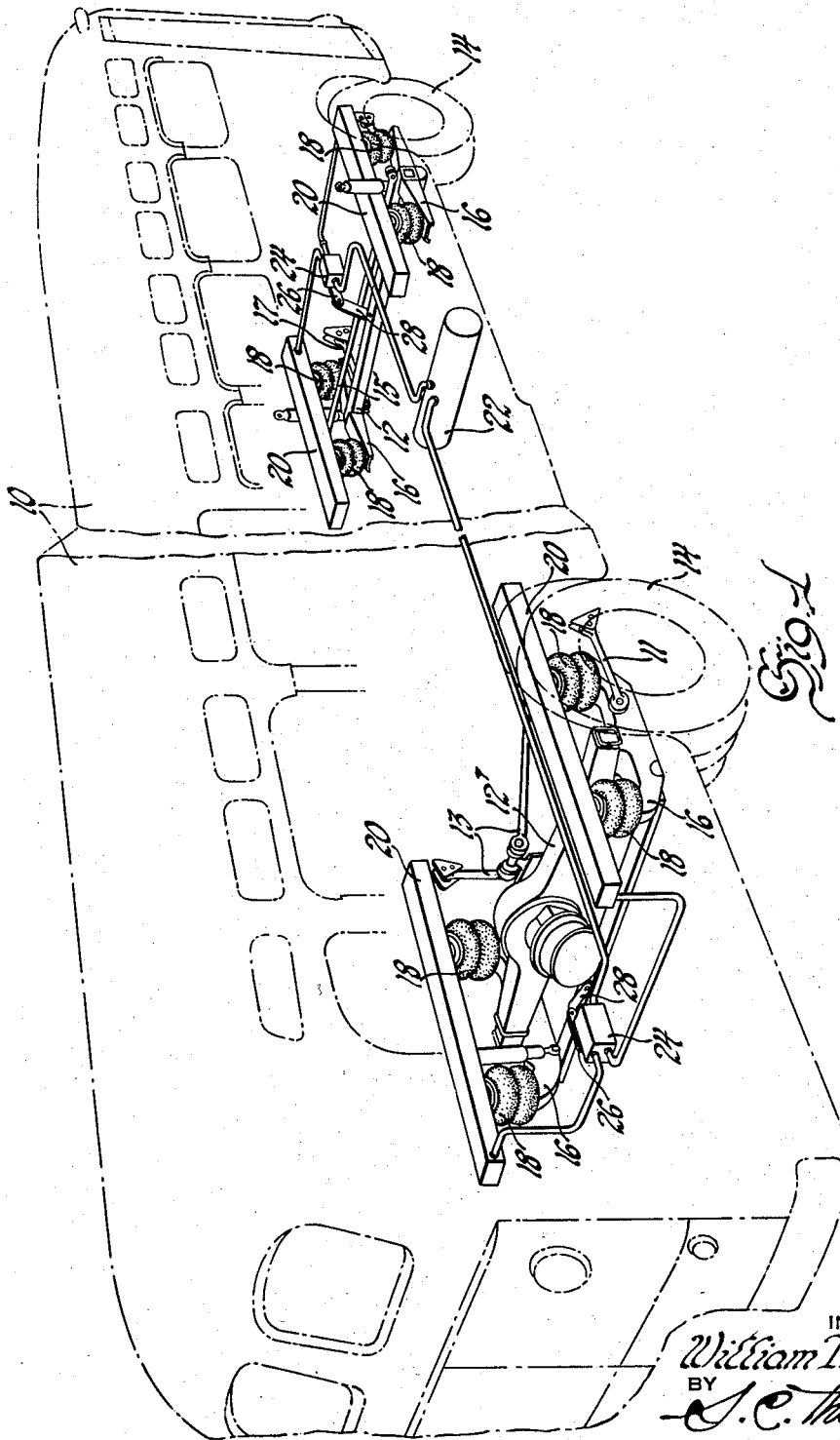

April 14, 1959 W. T. MENEWISCH 2,881,799
TWO-WAY HEIGHT CONTROL OVERRULE FOR AIR SUSPENDED VEHICLE
Filed Jan. 5, 1956 4 Sheets-Sheet 1

INVENTOR
William T. Menewisch
BY
J. C. Thorpe
ATTORNEY

April 14, 1959 W. T. MENEWISCH 2,881,799
TWO-WAY HEIGHT CONTROL OVERRULE FOR AIR SUSPENDED VEHICLE
Filed Jan. 5, 1956 4 Sheets-Sheet 3

INVENTOR.
William T. Menewisch
BY
J. C. Thorpe
ATTORNEY

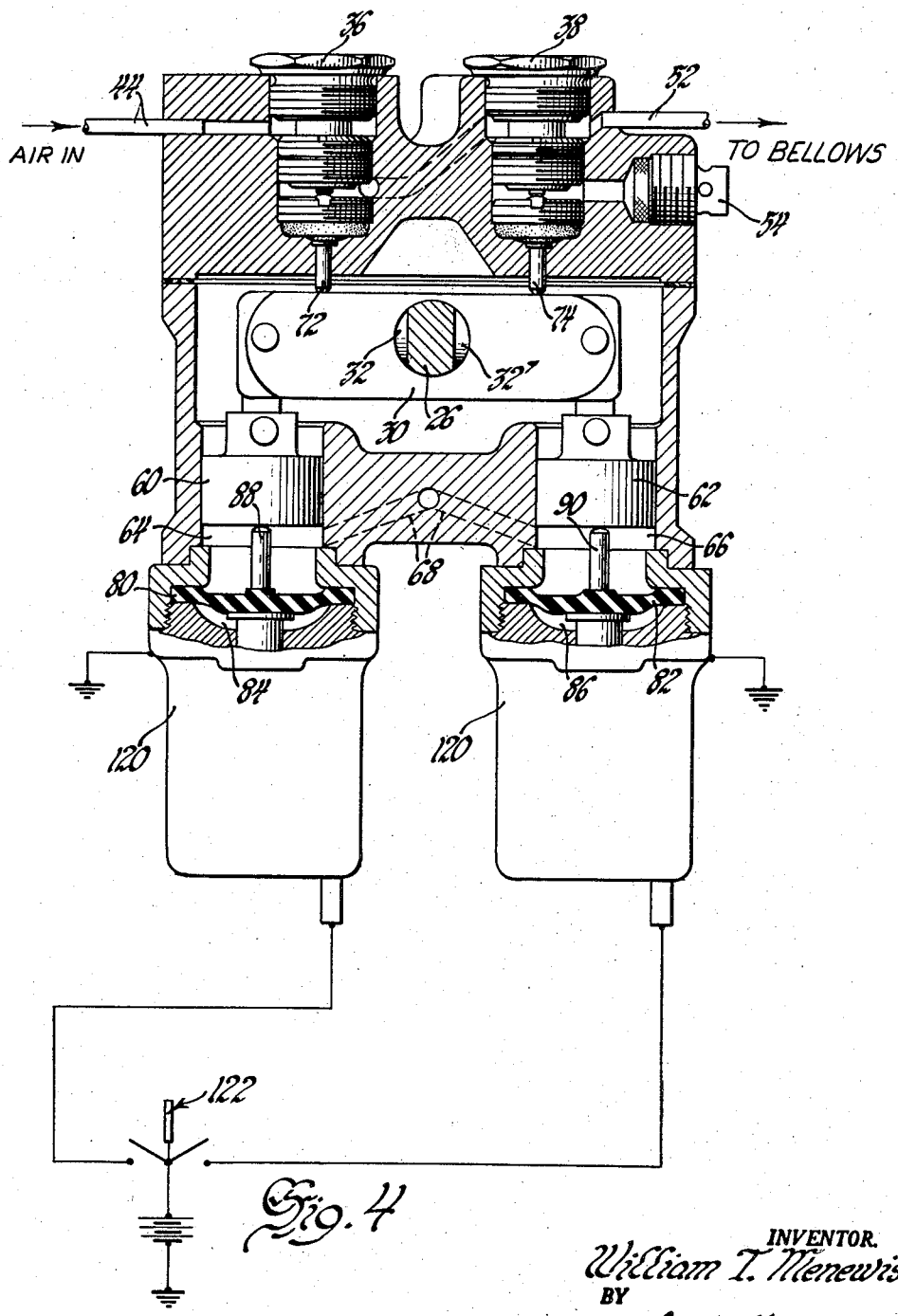

United States Patent Office 2,881,799
Patented Apr. 14, 1959

2,881,799

TWO-WAY HEIGHT CONTROL OVERRULE FOR AIR SUSPENDED VEHICLE

William T. Menewisch, Birmingham, Mich., assignor to General Motors Corporation, Detroit, Mich., a corporation of Delaware Application January 5, 1956, Serial No. 557,564

7 Claims. (Cl. 137—596)

This invention relates to valve mechanisms of the type shown in Rossman Patent 2,670,201 and has as its principal object to modify the structure of such mechanisms thereby to achieve desirable effects to be later explained herein.

The purpose of the Rossman device is to provide for automatic leveling in an automotive vehicle equipped with a pneumatic suspension system. Generally described, the device comprises a body portion including a housing suitably affixed to the frame of the vehicle and an oscillatable lever or arm journaled in the housing and connected to an axle via a suitable linkage. The body portion of the device is a component of the air circuit, additionally including a source of air pressure, an air reservoir, which may be integrated with the vehicle frame, and air bellows or springs carried between the frame and axle. Air is supplied to the reservoir and springs through the leveling device which serves to maintain the spacing between the vehicle axle and the frame or body of the vehicle constant irrespective of the load. Thus, if the load increases the device automatically charges air to the reservoir and bellows to compensate for the additional weight. On the other hand, if the load decreases air is automatically released from the bellows-reservoir system.

According to the invention, I alter or modify the device as shown in the Rossman patent to the end that the automaticity thereof may be interrupted when desired by the operator of the vehicle so that the same may be utilized as a control through which the pneumatic springs may be applied as hoists or jacks with respect to the body of the vehicle. In this way I may inter alia provide for—

(1) Raising or lowering of the rear end of the tractor so as to engage various height trailers without adjusting the landing gear of the trailer.

(2) Raising or lowering of a truck body to bring it up to or down to the level of a loading dock.

(3) Lowering the vehicle body for clearance as at an overpass, or raising it for ground clearance should circumstances necessitate.

(4) Raising the vehicle body to supply increased crawl space for maintenance operations.

(5) Raising front end of the vehicle and lowering the rear end thereof for dump unloading.

(6) Shifting of the weight on tandem axles by exhausting air from the air springs associated with one of the axles. Thus, where only one of the tandem axles is a driving axle more weight can be so placed thereon for increased traction on slippery roads.

(7) Coupling or uncoupling trailer when tractor is at right angles to trailer by raising or lowering tractor so as to align fifth wheel carried by king pin.

Figure 2:
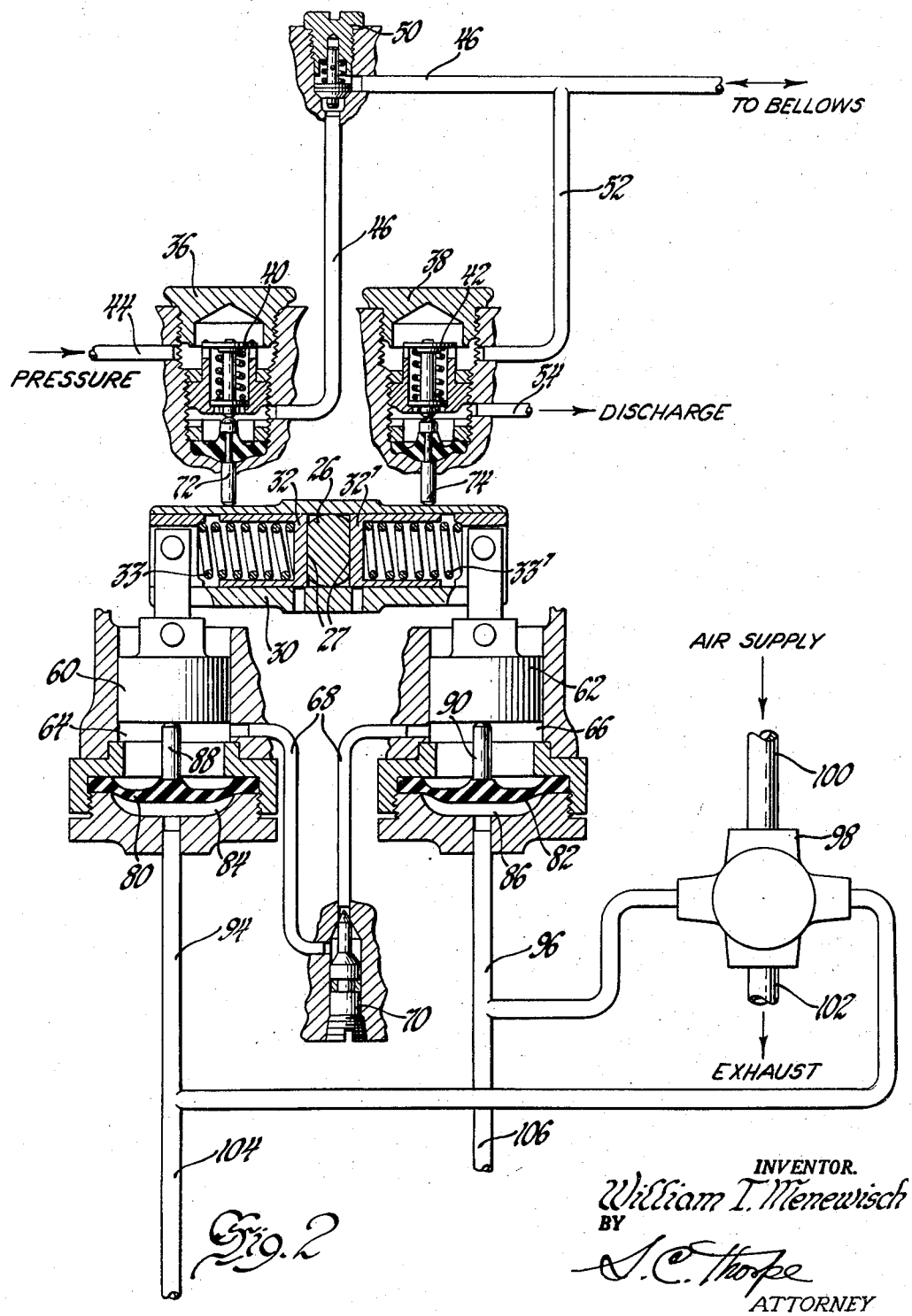
Figure 3:
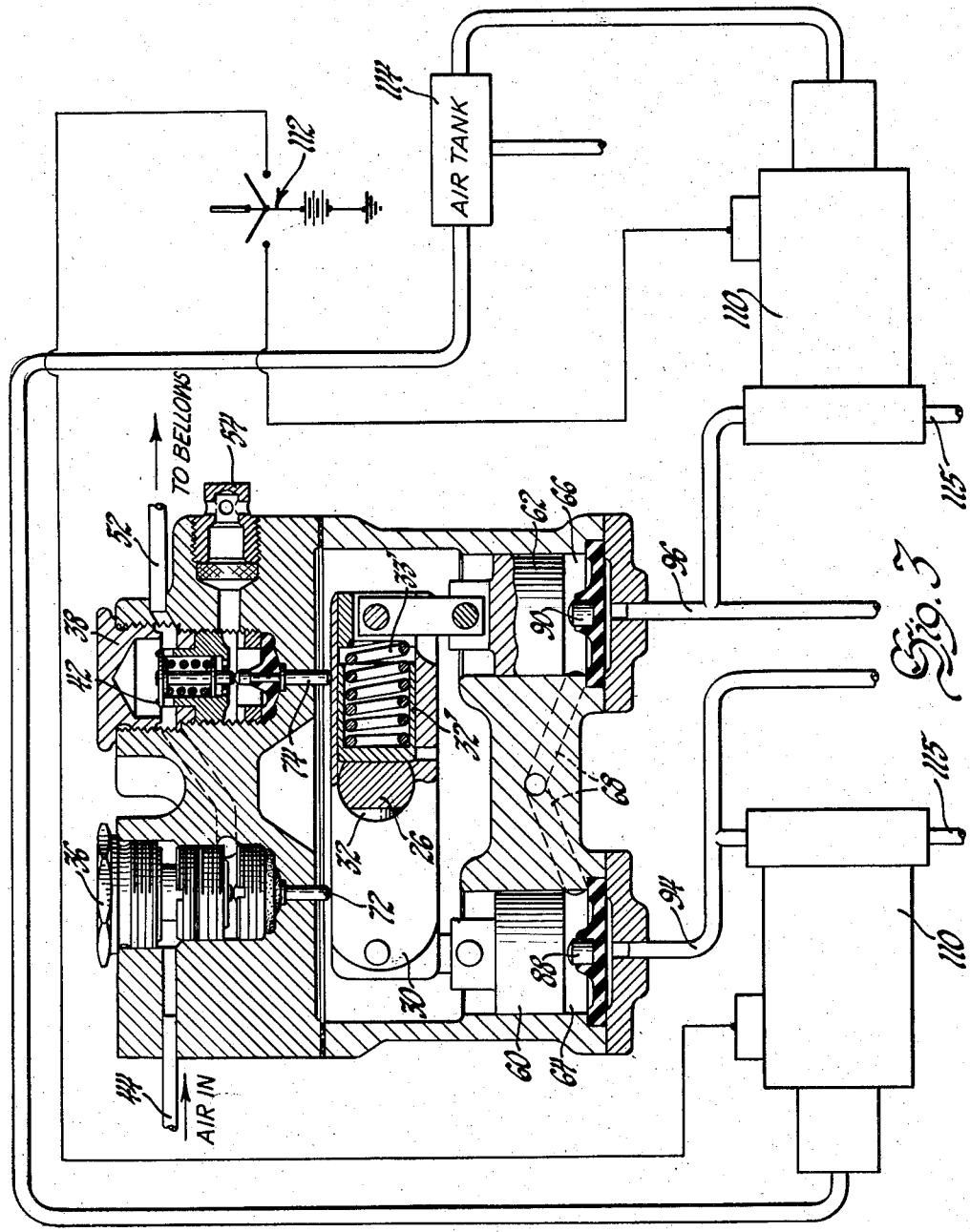

I shall particularly described my invention with the aid of the accompanying drawings in which Figure 1 is illustrative of an air suspension system of a type presently in commercial use;

Figure 2 is a schematic representation of the automatic leveling device previously mentioned, the device being shown as modified in accordance with the present invention; and Figures 3 and 4 illustrate two other modes of applying the invention.

Referring first to Figure 1, the numeral 10 indicates the body of a conventional coach, the same being carried on axles 12, 12' mounting wheels 14 at their outer ends. Disposed over each axle housing are beams 16 seating air bellows 18, the bellows being open to reservoirs 20 thereabove. These reservoirs are connected by suitable air lines to a source of air supply indicated as a tank 22. Interposed in the air lines are leveling devices 24, one for each axle. Each leveling device serves both sets of bellows on the axle.

Extending from and suitably journaled in the housing of each leveling device is a lever 26 connected to the corresponding axle through a linkage member 28. It will be immediately seen that any movement of the axle relative to the frame or body of the vehicle will necessarily be accompanied by oscillation of the lever 26. Operation of the pneumatic suspension is marked by air interchange between the bellows and reservoirs.

Thrust rods 11, 13, 15, and 17 serve to take braking, acceleration, and side loads not absorbable by the air springs which are functional only in a vertical direction.

Going now to Figure 2, it will be observed that the lever 26, or more accurately that portion thereof extending inwardly of the housing beyond the journal, is received by a hollow beam member 30 confining plungers 32, 32' loaded by springs 33, 33' operating to maintain the plungers in close contact with the arm 26, which in this area has flattened sides 27.

Above the beam 30 are a pair of valves 36, 38 each comprising a spring-loaded land 40, 42 respectively. A pressure line 44 terminates at the valve 36. At the other side of this valve is a conduit 46 which is open to the air reservoir and bellows with respect to which the leveling device is functional. Check valve 50 serves to present back flow of air from the bellows.

Valve 38 will be seen as also connected to the conduit 46, the connection being effected via a line 52. This valve has a second outlet 54, opening to the atmosphere.

Depending from the beam 30 is a pair of pistons 60, 62 confined within chambers 64, 66 respectively, these chambers being interconnected through a passageway 68. Within the passageway is a variable restrictor 70 adapted to throttle fluid flow between the chambers.

The purpose of the pistons 60, 62 is to provide a dash pot effect with respect to turning movement of the beam 30 caused by rotation of the arm 26. As indicated, the chambers 64, 66 and the passageway 68 are filled with an oil of suitable viscosity and other characteristics at the time of assembly of the leveling device.

Valve 36 comprises a plunger 72 adapted to be engaged by the beam 30. A similar plunger 74 is comprised as part of valve 38. With this arrangement, on the clockwise turning of beam 30 the resulting elevation of the plunger 72 opens line 44 to line 46 and hence to the corresponding reservoir and bellows. Conversely, when the beam is turned counter-clockwise valve 36 remains closed while valve 38 vents to the atmosphere via passageway 54.

As fully explained in Rossman Patent 2,670,201, the purpose of the dash pot represented by the piston 60, 62 and the associated variable restrictor 70 is to avoid any substantial movement of the beam 30 incident to deflection of the springs 18 from road shocks on operation of the vehicle. In other words, the apparatus shown in Figure 2 comes into play only during loading and unloading operations, i.e. when the load change represents a relatively slowly acting force.

In accordance with the present invention, there is disposed below each of the pistons 60, 62 (Fig. 2) a diaphragm 80, 82, respectively, delineating chambers 84, 86, respectively. Each diaphragm carries a stem 88, 90, respectively, adapted to engage the undersurface of the corresponding piston.

Chambers 84 and 86 are connected via lines 94, 96, respectively, with a valve 98 additionally connected via a conduit 100 to a source of air supply and venting to the atmosphere at 102. Valve 98 should be assumed as located in the cab or operator's compartment of the vehicle.

Branch lines 104 and 106 extend to the other leveling valve (see Fig. 1) carried by the vehicle. Thus, it will be seen that on manipulation of the valve 98 in the direction resulting in the admission of air under the diaphragm 82, beam 30 irrespective of the position of lever 26 will be caused to turn to bring about exhaustion of air via the passageway 54. Conversely, if the valve 98 is manipulated to cause the development of a pressure under diaphragm 80, beam 30 will be caused to turn clockwise to bring about admission of air to the air springs regardless of the position of lever 26. In this way, the automaticity of the leveling device is overruled by the driver and the air springs employed in the manner of jacks to raise or lower the vehicle body as dictated by circumstances.

The oscillation of the lever 26, necessarily occurring whenever the vehicle body is raised or lowered, is in effect absorbed by the metal springs 33, 33', hence there is no interference with the action of the pressure of the air under the diaphragms. These springs also absorb excess turning movement of the lever occurring in the normal operation of the vehicle. In other words, when the beam in turning engages the housing of the leveling device, the lever 26, in case of any further rotation thereof, overcomes the resistance of the spring located in the direction of the rotation.

Figures 3 and 4, wherein like numerals are employed to designate like parts in Figure 2 and wherein these parts are illustrated less diagrammatically, show modified forms of the invention. Thus, in the case of Figure 3 there are employed in lieu of the four-way valve 98 two electric or solenoid valves 110 under the control of a switch 112 located in the cab or driver's compartment of the vehicle. These electric valves, which include air vents 115, control the air flow from the air source, indicated as a tank 114.

In Figure 4 the interruption of the automaticity of the leveling valve is accomplished without the use of air pressure through employment of a pair of push solenoids 120 in circuit with a switch 122. The armatures of the solenoids actuate plungers 88, 90 which are normally maintained in their shown positions by springs forming part of the solenoid assemblies.

It will be understood that for certain of the operations indicated in the forepart hereof certain auxiliary valving is necessary. Thus, should it be desired to provide a truck having a tiltable body for dumping, remotely controllable valves may be interposed in branch lines to the end that the rear end of the body may be lowered and the front or cab end raised.

I claim:

1. In a normally automatic control mechanism for a pneumatic system, said mechanism comprising an inlet passageway and a pair of outlet passageways together with a pair of spring-loaded valve elements one of which is functional with respect to said inlet passageway, the other of which is functional with respect to said outlet passageways, and an angularly movable beam member operably related to said valve elements to determine their relative positions as governed by particular conditions, said beam member having a dash pot associated therewith so that it is responsive only to relatively slowly acting forces, said dash pot including a pair of pistons confined in cylinders having restricted communication, the combination with said pistons of diaphragm means responsive to fluid pressure whereby the automaticity of the mechanism may be interrupted and the same made responsive to the will of an operator.

2. In a normally automatic fluid control mechanism comprising an inlet passageway and a pair of outlet passageways together with a pair of valve elements, one of which is functional with respect to asid inlet passageway, the other of which is functional with respect to said outlet passageways, and a member operably related to said valve elements to determine their relative positions as governed by particular conditions, said member having a dash pot associated therewith so that it is responsive only to relatively slowly acting forces, said dash pot including a pair of pistons confined in cylinders having restricted communication, the combination of pressure responsive diaphragm means operably associated with said pistons and valve control means for admitting fluid under pressure to the chambers in which the diaphragms are confined thereby to interrupt the automaticity of the mechanism and make the same responsive to the will of an operator.

3. In a normally automatic fluid control mechanism comprising an inlet passageway and a pair of outlet passageways together with a pair of valve elements, one of which is functional with respect to said inlet passageway, the other of which is functional with respect to said outlet passageways, and a member operably related to said valve elements to determine their relative positions as governed by particular conditions, said member having a dash pot associated therewith so that it is responsive only to relatively slowly acting forces, said dash pot including a pair of pistons confined in cylinders having restricted communication, the combination of pressure responsive diaphragm means operably associated with said pistons and means for admitting fluid under pressure to the chambers confining the diaphragms thereby to interrupt the automaticity of the mechanism and to make the same responsive to the will of an operator, said last means including a pair of electrically operated valves.

4. In a normally automatic fluid control mechanism comprising an inlet passageway and a pair of outlet passageways together with a pair of valve elements one of which is functional with respect to said inlet passageway, the other of which is functional with respect to said outlet passageways, and a member operably related to said valve elements to determine their relative positions as governed by particular conditions, said member having a dash pot associated therewith so that it is responsive only to relatively slowly acting forces, said dash pot including a pair of pistons confined in cylinders having restricted communication, the combination of means whereby the automaticity of the mechanism may be interrupted and the same made responsive to the will of an operator, said last means including a pair of plungers operatively related to said pistons, each plunger having a normal inoperative position determined by yieldable means associated therewith, and a solenoid operably associated with each said plunger for moving the same into operative relation with the corresponding piston, said solenoid being a component of an electric circuit additionally including a remote control for the solenoid.

5. In a normally automatic leveling control device for a pneumatic suspension system, said device comprising an inlet passageway and a pair of outlet passageways together with a pair of spring-loaded valve elements one of which is functional with respect to said inlet passageway, the other which is functional with respect to said outlet passageways, and an angularly movable beam member operably related to said valve elements to determine their relative positions as governed by particular conditions, said beam member having a dash pot associated therewith so that it is responsive only to relatively slowly acting forces, said dash pot including a pair of pistons confined in cylinders having restricted communication, the combination of pressure responsive diaphragm means operably associated with said pistons and valve control means for admitting fluid under pressure to the chambers in which the diaphragms are confined thereby to interrupt the automaticity of the device and make the same responsive to the will of an operator.

6. In a normally automatic leveling control device for a pneumatic suspension system, said device comprising an inlet passageway and a pair of outlet passageways together with a pair of spring-loaded valve elements one of which is functional with respect to said inlet passageway, the other which is functional with respect to said outlet passageways, and an angularly movable beam member operably related to said valve elements to determine their relative positions as governed by particular conditions, said beam member having a dash pot associated therewith so that it is responsive only to relatively slowly acting forces, said dash pot including a pair of pistons confined in cylinders having restricted communication, the combination of pressure responsive diaphragm means operably associated with said pistons and means for admitting fluid under pressure to the chambers confining the diaphragms thereby to interrupt the automaticity of the device and to make the same responsive to the will of an operator, said last means including a pair of electrically operated valves.

7. In a normally automatic leveling control device for a pneumatic suspension system, said device comprising an inlet passageway and a pair of outlet passageways together with a pair of spring-loaded valve elements one of which is functional with respect to said inlet passageways, the other which is functional with respect to said outlet passageways, and an angularly movable beam member operably related to said valve elements to determine their relative positions as governed by particular conditions, said beam member having a dash pot associated therewith so that it is responsive only to relatively slowly acting forces, said dash pot including a pair of pistons confined in cylinders having restricted communication, the combination of means whereby the automaticity of the device may be interrupted and the same made responsive to the will of an operator, said last means including a pair of plungers operatively related to said pistons, each plunger having a normal inoperative position determined by yieldable means associated therewith, and a solenoid operably associated with each said plunger for moving the same into operative relation with the corresponding piston, said solenoid being a component of an electric circuit additionally including a remote control for the solenoid.

References Cited in the file of this patent
UNITED STATES PATENTS

| 1,560,439 | Trenor | Nov. 3, 1925 |
| 2,308,285 | Jeffrey | Jan. 12, 1943 |
| 2,630,828 | Bent | Mar. 10, 1953 |
| 2,670,201 | Rossman | Feb. 23, 1954 |